US012669952B2

(12) United States Patent
Zhao et al.

(10) Patent No.: US 12,669,952 B2
(45) Date of Patent: Jun. 30, 2026

(54) METHOD FOR PERFORMING ACCELERATION OPERATION ON FEATURE DATA, MEDIUM, AND DEVICE

(71) Applicant: BEIJING HORIZON INFORMATION TECHNOLOGY CO., LTD., Beijing (CN)

(72) Inventors: Zhuoran Zhao, Beijing (CN); Zhao Gu, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 126 days.

(21) Appl. No.: 18/919,537

(22) Filed: Oct. 18, 2024

(65) Prior Publication Data

US 2025/0130732 A1     Apr. 24, 2025

(30) Foreign Application Priority Data

Oct. 19, 2023    (CN) .......................... 202311360990.5

(51) Int. Cl.
G06F 3/06          (2006.01)
G06T 1/60          (2006.01)
(52) U.S. Cl.
CPC .......... G06F 3/0644 (2013.01); G06F 3/0614 (2013.01); G06T 1/60 (2013.01)
(58) Field of Classification Search
CPC .. G06F 3/0644; G06F 3/0614; G06F 15/7846; G06T 1/60; G06N 3/063; Y02D 10/00
See application file for complete search history.

(56) References Cited

U.S. PATENT DOCUMENTS 11,501,145 B1 * 11/2022 Huynh ..................... G06N 3/02
2007/0245074 A1 * 10/2007 Rosenbluth ......... G06F 12/0875
711/110

(Continued)

FOREIGN PATENT DOCUMENTS

CN        115618930 A   *   1/2023   ............. G06N 3/063
JP        2001101396 A      4/2001
(Continued)

OTHER PUBLICATIONS

Messaoud, S., Bouaafia, S., Maraoui, A., Ammari, A. C., Khriji, L., & Machhout, M. (2022). Deep convolutional neural networks-based Hardware-Software on-chip system for computer vision application. Computers & Electrical Engineering, 98, 107671.*

(Continued)

*Primary Examiner* — Sarah Lhymn
(74) *Attorney, Agent, or Firm* — K&L Gates LLP

(57)               ABSTRACT

A method includes: determining, from input feature data, an input point corresponding to an output point in to-be-calculated output feature data; determining a target region tag that matches the input point based on a position parameter of the input point; determining existence information on a target feature value group mapped by the target region tag in an on-chip buffer, where a feature value group mapped by any region tag includes feature values of a plurality of points in the input feature data that match the region tag; determining a target memory adapted to the existence information from the on-chip buffer and an on-chip main memory that stores the input feature data; calculating a feature value of the output point based on a feature value of the input point in the target memory; and calculating the output feature data based on the feature value of the output point.

20 Claims, 9 Drawing Sheets

(56) References Cited

U.S. PATENT DOCUMENTS

| | | | |
|---|---|---|---|
| 2009/0170693 A1 | 7/2009 | Ikeda | |
| 2013/0236118 A1 | 9/2013 | Takahashi | |
| 2017/0177489 A1* | 6/2017 | Zhang | G06F 3/0641 |
| 2018/0189229 A1* | 7/2018 | Desoli | G06N 3/0464 |
| 2018/0189641 A1* | 7/2018 | Boesch | G06N 3/0464 |
| 2019/0035052 A1 | 1/2019 | Uchida et al. | |
| 2019/0332540 A1* | 10/2019 | Kang | G06F 12/0864 |
| 2022/0100676 A1* | 3/2022 | Yan | G06N 3/0455 |
| 2023/0376756 A1* | 11/2023 | Yoo | G06V 20/64 |
| 2024/0152726 A1* | 5/2024 | Feng | G06N 3/04 |
| 2024/0242481 A1* | 7/2024 | Rosewarne | H04N 19/186 |
| 2025/0199704 A1* | 6/2025 | Zhu | G06F 3/0611 |
| 2026/0004575 A1* | 1/2026 | Lee | G06V 10/82 |

FOREIGN PATENT DOCUMENTS

| | | |
|---|---|---|
| JP | 2005044098 A | 2/2005 |
| JP | 2009172601 A | 8/2009 |
| JP | 2010176547 A | 8/2010 |
| JP | 2013186624 A | 9/2013 |
| JP | 2017175498 A | 9/2017 |

OTHER PUBLICATIONS

Shehzad, F., Rashid, M., Sinky, M. H., Alotaibi, S. S., & Zia, M. Y. I. (2021). A scalable system-on-chip acceleration for deep neural networks. IEEE Access, 9, 95412-95426.*

Kang HJ. AoCStream: All-on-chip CNN accelerator with stream-based line-buffer architecture. arXiv preprint arXiv:2212.11438. Dec. 22, 2022.*

Extended European Search Report from corresponding European Patent Application No. 24207486.2, mailed on Mar. 12, 2025.

First Japanese office action from corresponding Japanese patent application No. 2024-184401, mailed on Sep. 2, 2025 and its English translation.

Decision of Refusal from corresponding Japanese patent application No. 2024-184401, mailed on Dec. 9, 2025 and its English translation.

Erfan Azarkhish et al: "Neurostream: Scalable and Energy Efficient Deep Learning with Smart Memory Cubes", arxiv.org, Jan. 23, 2017.

Anonymous: "Cache placement policies—Wikipedia", May 3, 2023, pp. 1-8, https://en.wikipedia.org/w/index.php?title=Cache_placement_policies&oldid=1156526328.

Azarkhish Erfan et al: "Logic-Base Interconnect Design for Near Memory Computing in the Smart Memory Cube", IEEE Transactions on Very Large Scale Integration (VLSI) Systems, vol. 25, No. 1, Jan. 1, 2017, pp. 210-223.

Jie Yang et al: "Mixed-Precision Embedding Using a Cache", arxiv.org, Oct. 21, 2020.

Kurth Andreas et al: "HEROv2: Full-Stack Open-Source Research Platform for Heterogeneous Computing", IEEE Transactions on Parallel and Distributed Systems, vol. 33, No. 12, Jul. 7, 2022, pp. 4368-4382.

* cited by examiner

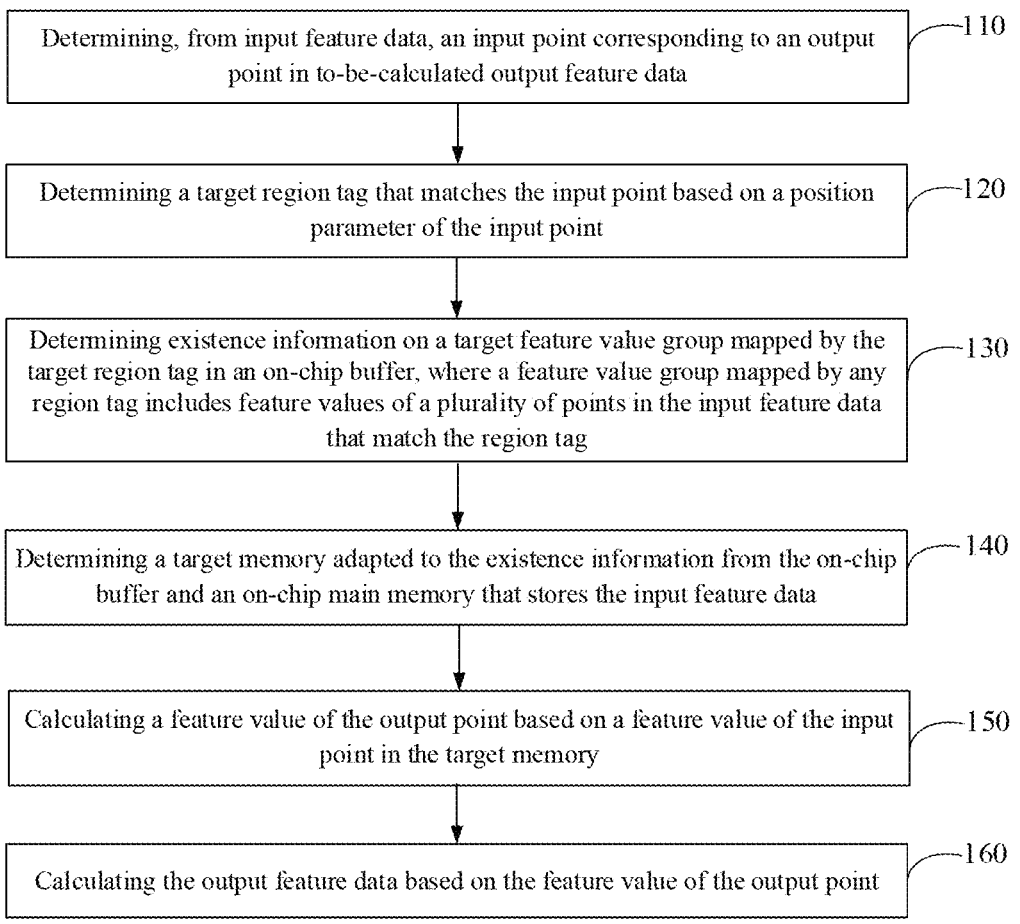

Determining, from input feature data, an input point corresponding to an output point in to-be-calculated output feature data ⌐110

Determining a target region tag that matches the input point based on a position parameter of the input point ⌐120

Determining existence information on a target feature value group mapped by the target region tag in an on-chip buffer, where a feature value group mapped by any region tag includes feature values of a plurality of points in the input feature data that match the region tag ⌐130

Determining a target memory adapted to the existence information from the on-chip buffer and an on-chip main memory that stores the input feature data ⌐140

Calculating a feature value of the output point based on a feature value of the input point in the target memory ⌐150

Calculating the output feature data based on the feature value of the output point ⌐160

FIG. 1

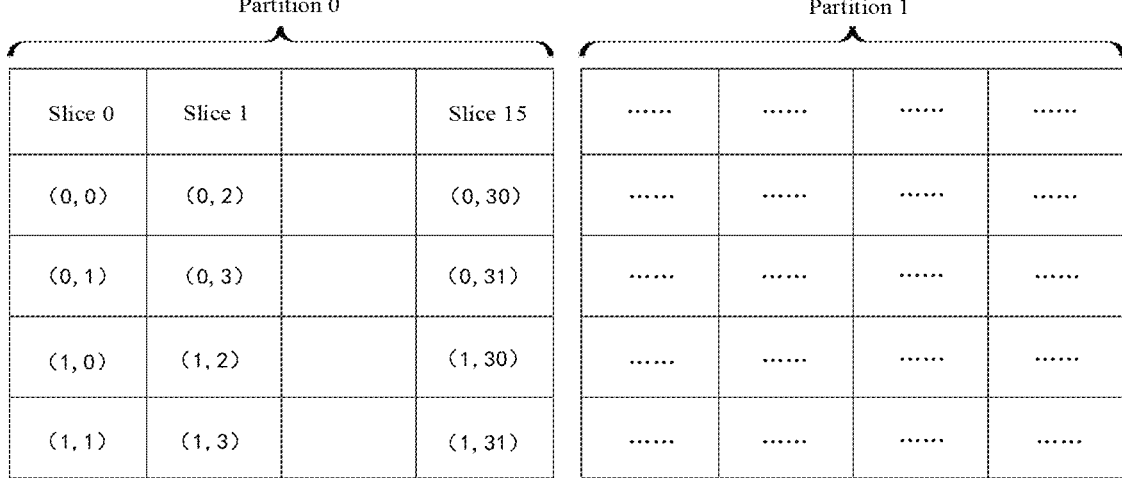

FIG. 2

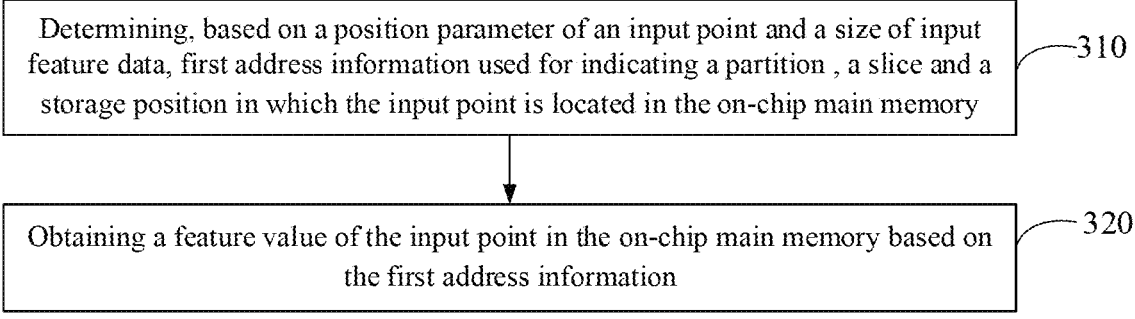

Determining, based on a position parameter of an input point and a size of input feature data, first address information used for indicating a partition , a slice and a storage position in which the input point is located in the on-chip main memory ⟵310

Obtaining a feature value of the input point in the on-chip main memory based on the first address information ⟵320

FIG. 3

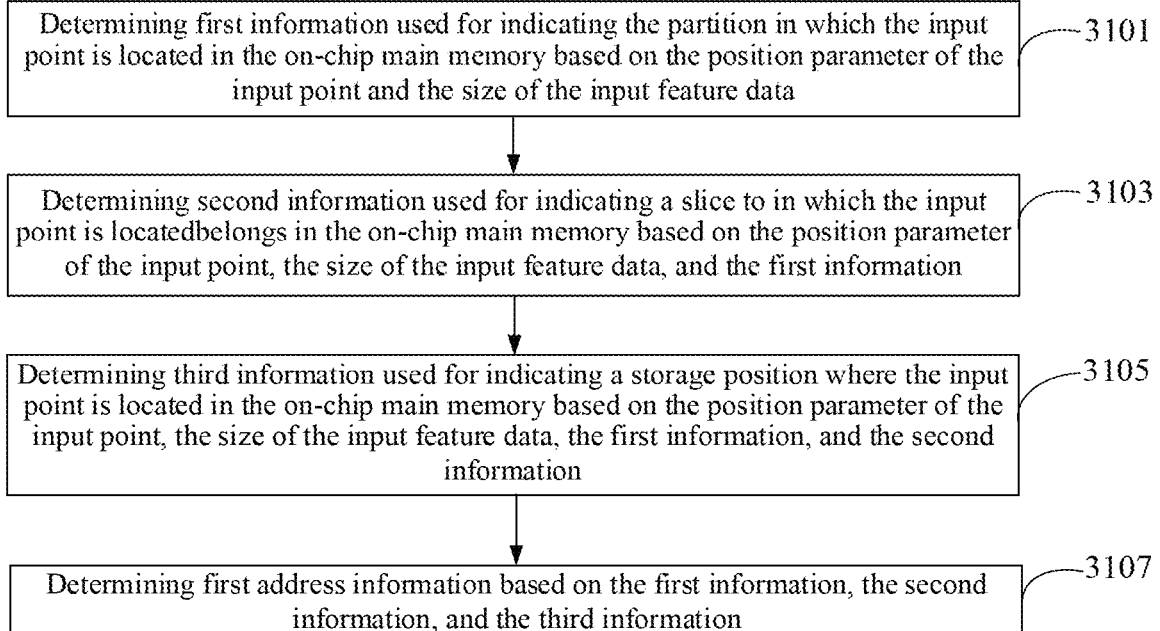

Determining first information used for indicating the partition in which the input point is located in the on-chip main memory based on the position parameter of the input point and the size of the input feature data ⟵3101

Determining second information used for indicating a slice to in which the input point is locatedbelongs in the on-chip main memory based on the position parameter of the input point, the size of the input feature data, and the first information ⟵3103

Determining third information used for indicating a storage position where the input point is located in the on-chip main memory based on the position parameter of the input point, the size of the input feature data, the first information, and the second information ⟵3105

Determining first address information based on the first information, the second information, and the third information ⟵3107

FIG. 4

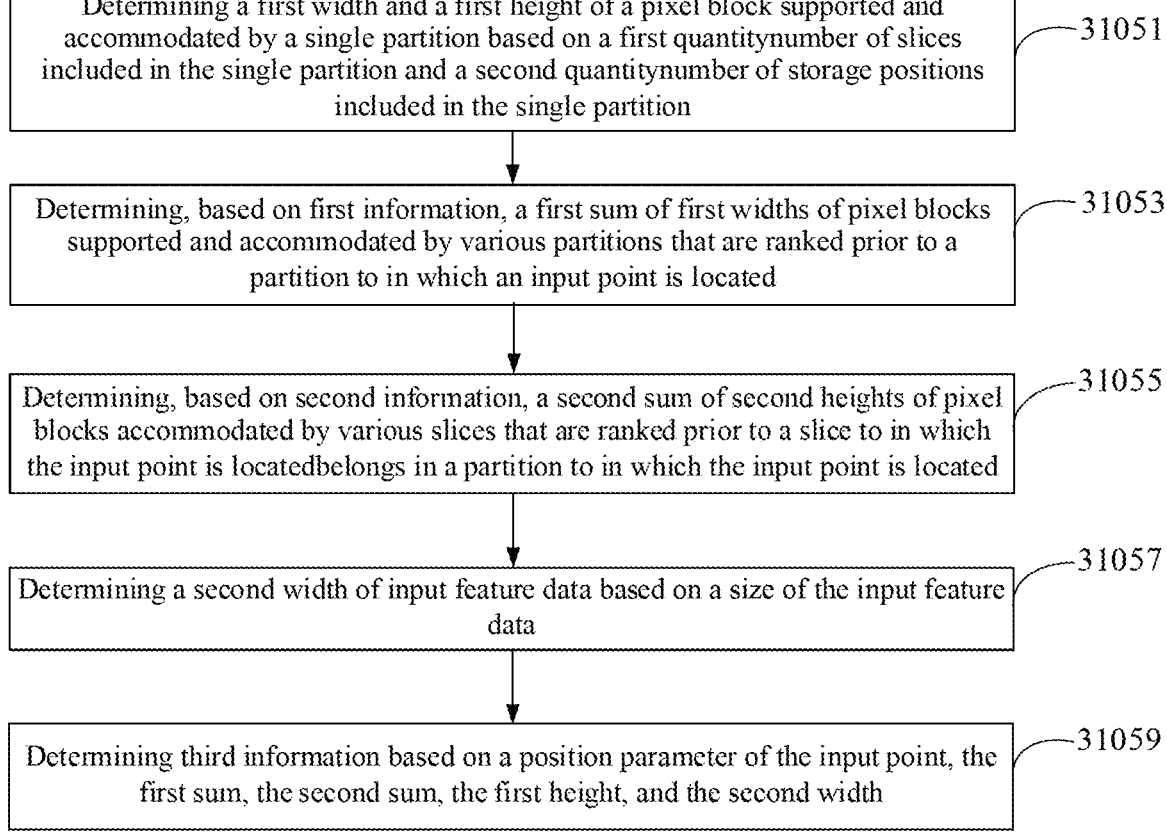

Determining a first width and a first height of a pixel block supported and accommodated by a single partition based on a first quantitynumber of slices included in the single partition and a second quantitynumber of storage positions included in the single partition    ⌐31051

Determining, based on first information, a first sum of first widths of pixel blocks supported and accommodated by various partitions that are ranked prior to a partition to in which an input point is located    ⌐31053

Determining, based on second information, a second sum of second heights of pixel blocks accommodated by various slices that are ranked prior to a slice to in which the input point is locatedbelongs in a partition to in which the input point is located    ⌐31055

Determining a second width of input feature data based on a size of the input feature data    ⌐31057

Determining third information based on a position parameter of the input point, the first sum, the second sum, the first height, and the second width    ⌐31059

FIG. 7

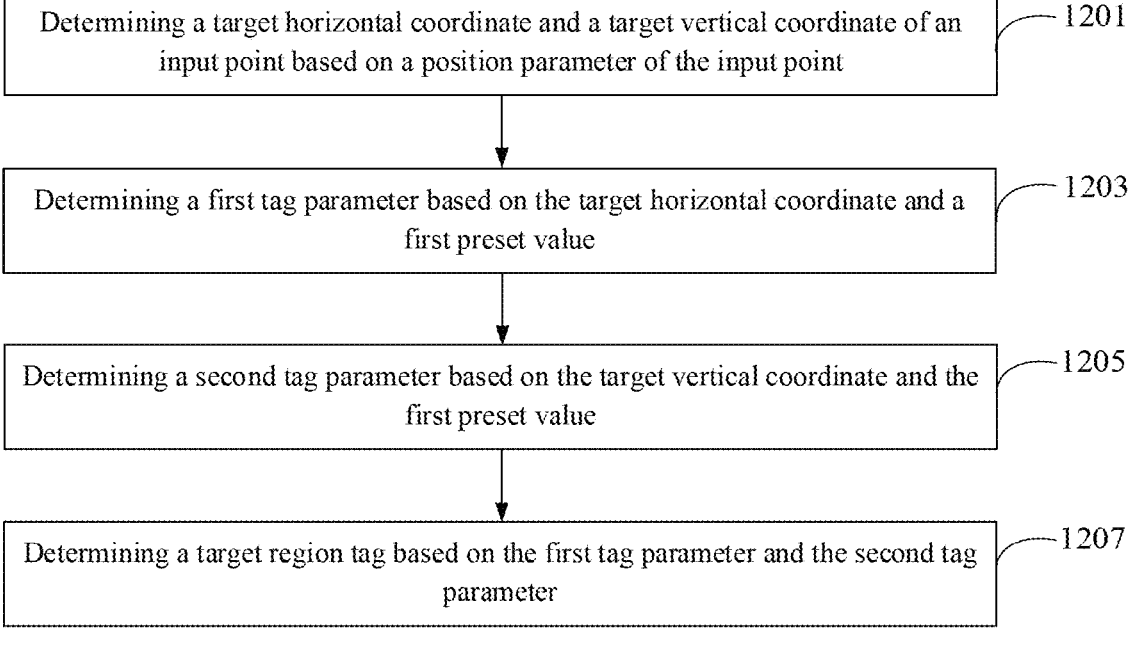

| Determining a target horizontal coordinate and a target vertical coordinate of an input point based on a position parameter of the input point | 1201 |

| Determining a first tag parameter based on the target horizontal coordinate and a first preset value | 1203 |

| Determining a second tag parameter based on the target vertical coordinate and the first preset value | 1205 |

| Determining a target region tag based on the first tag parameter and the second tag parameter | 1207 |

FIG. 8

| For another points among a plurality of points that match a target region tag except an input point, determining, based on position parameters of the another points and a size of input feature data, second address information used for indicating a partition, a slice and a storage position in which the another points are located in the on-chip main memory | 910 |

| Obtaining feature values of the another points in the on-chip main memory based on the second address information to obtain a target feature value group including a feature value of the input point and the feature values of the another points, and adding the target feature value group to an on-chip buffer | 920 |

FIG. 9

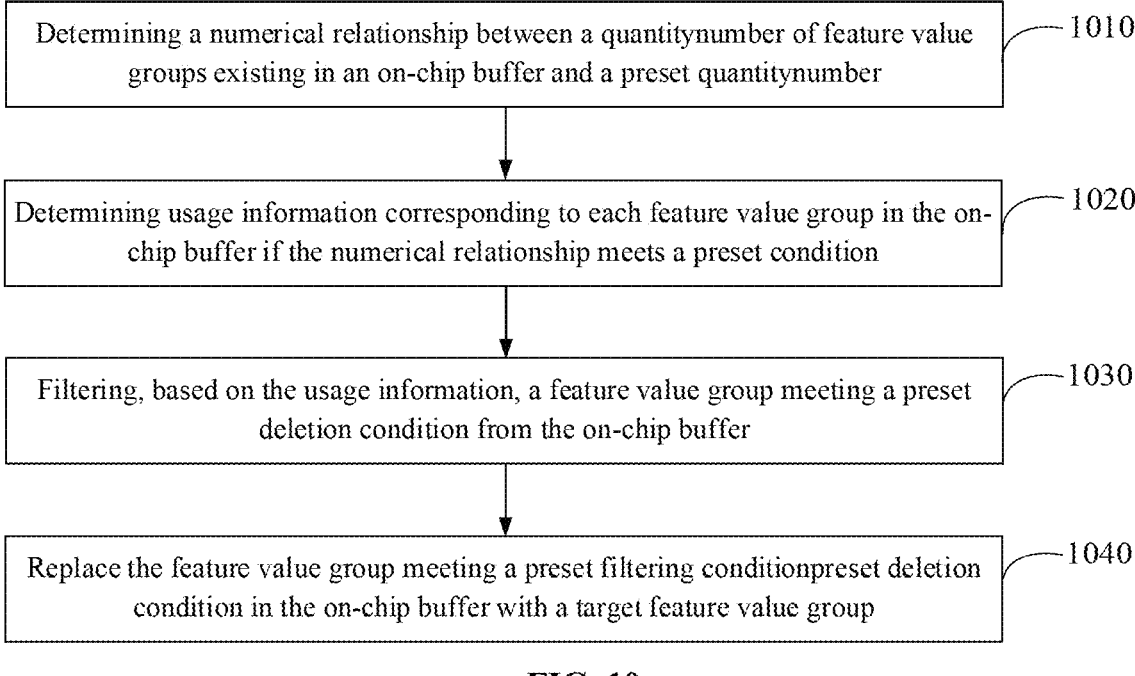

| Determining a numerical relationship between a quantitynumber of feature value groups existing in an on-chip buffer and a preset quantitynumber | ⟋—1010 |

↓

| Determining usage information corresponding to each feature value group in the on-chip buffer if the numerical relationship meets a preset condition | ⟋—1020 |

↓

| Filtering, based on the usage information, a feature value group meeting a preset deletion condition from the on-chip buffer | ⟋—1030 |

↓

| Replace the feature value group meeting a preset filtering conditionpreset deletion condition in the on-chip buffer with a target feature value group | ⟋—1040 |

FIG. 10

| Determining a plurality of calculation tasks, where each calculation task is used to calculate feature values of some output points in to-be-calculated output feature data | ⟋—1110 |

↓

| Assigning different calculation tasks to different calculation components | ⟋—1120 |

↓

| Controlling different calculation components to concurrently execute corresponding calculation tasks | ⟋—1130 |

FIG. 11

Determining a data bus corresponding to a partition and a slice that are indicated by first address information ⌐3201

Obtaining a feature value of an input point from a storage position indicated by the first address information through the data bus corresponding to the partition and the slice that are indicated by the first address information ⌐3203

METHOD FOR PERFORMING ACCELERATION OPERATION ON FEATURE DATA, MEDIUM, AND DEVICE

CROSS-REFERENCE TO RELATED APPLICATION

The present application claims the benefit of Chinese Patent Application No. 202311360990.5, filed on Oct. 19, 2023, which is incorporated herein by reference in its entirety.

FIELD OF THE INVENTION

This disclosure relates to technologies of artificial intelligence, and in particular, to a method and an apparatus for performing an acceleration operation on feature data, a medium, and a device.

BACKGROUND OF THE INVENTION

In the technical field of artificial intelligence, there is usually a need for calculating output feature data based on input feature data. In some scenarios, an image may be scaled to obtain a scaled image, where the image before the scaling may be used as the input feature data, and the image after the scaling may be used as the output feature data.

SUMMARY OF THE INVENTION

This disclosure provides a method and an apparatus for performing an acceleration operation on feature data, a medium, and a device, to ensure computational efficiency for output feature data.

According to an aspect of an embodiment of this disclosure, a method for performing an acceleration operation on feature data is provided, including:

Determining, from input feature data, an input point corresponding to an output point in to-be-calculated output feature data;

determining a target region tag that matches the input point based on a position parameter of the input point;

determining existence information on a target feature value group mapped by the target region tag in an on-chip buffer, where a feature value group mapped by any region tag includes feature values of a plurality of points in the input feature data that match the region tag;

determining a target memory adapted to the existence information from the on-chip buffer and an on-chip main memory that stores the input feature data;

calculating a feature value of the output point based on a feature value of the input point in the target memory; and calculating the output feature data based on the feature value of the output point.

According to another aspect of an embodiment of this disclosure, an apparatus for performing an acceleration operation on feature data is provided, including:

a first determining module configured to determine an input point corresponding to an output point in to-be-calculated output feature data from input feature data;

a second determining module configured to determine a target region tag that matches the input point based on a position parameter of the input point determined by the first determining module;

a third determining module configured to determine existence information on a target feature value group mapped by the target region tag in an on-chip buffer determined by the second determining module, where a feature value group mapped by any region tag includes feature values of a plurality of points in the input feature data that match the region tag; a fourth determining module configured to determine a target memory adapted to the existence information determined by the third determining module from the on-chip buffer and an on-chip main memory that stores the input feature data;

a first calculation module configured to calculate a feature value of the output point based on a feature value of the input point in the target memory determined by the fourth determining module; and a second calculation module configured to calculate the output feature data based on the feature value of the output point calculated by the first calculation module.

According to still another aspect of an embodiment of this disclosure, a computer readable storage medium with a computer program stored thereon is provided, which is used for implementing the method for performing an acceleration operation on feature data described above.

According to a still further aspect of an embodiment of this disclosure, an electronic device is provided, including:

a processor; and a memory configured to store a processor-executable instruction, wherein the processor is configured to read the executable instruction from the memory, and execute the instruction to implement the method for performing an acceleration operation on feature data described above.

According to a still yet another aspect of an embodiment of this disclosure, a computer program product is provided. When instructions in the computer program product are executed by a processor, the method for performing an acceleration operation on feature data described above is implemented.

Based on the method and apparatus for performing an acceleration operation on feature data, the medium, the electronic device, and the computer program product that are provided in the foregoing embodiments of this disclosure, the input point corresponding to the output point in the to-be-calculated output feature data may be determined from the input feature data; the target region tag that matches the input point may be determined based on the position parameter of the input point; with reference to the existence information on the target feature value group mapped by the target region tag in the on-chip buffer, the proper target memory may be determined from the on-chip buffer and the on-chip main memory that stores the input feature data; the feature value of the output point may be calculated based on the feature value of the input point in the target memory; and the output feature data may be calculated based on the feature value of the output point. In this way, through application of a tag strategy, the feature value of the input point may be preferentially read from the on-chip buffer. If there is no required feature value in the on-chip buffer, the feature value of the input point is read from the on-chip main memory. This is beneficial for improving reading efficiency for the input feature data, so as to implement an acceleration operation on the input feature data, thereby ensuring computational efficiency for the output feature data.

BRIEF DESCRIPTION OF THE DRAWINGS

FIG. 1 is a schematic flowchart of a method for performing an acceleration operation on feature data according to some exemplary embodiments of this disclosure;

FIG. 2 is a schematic diagram of storage levels of an on-chip main memory according to some exemplary embodiments of this disclosure;

FIG. 3 is a schematic flowchart of a manner for obtaining a feature value of an input point in a target memory according to some exemplary embodiments of this disclosure;

FIG. 4 is a schematic flowchart of a manner for obtaining first address information according to some other exemplary embodiments of this disclosure;

FIG. 7 is a schematic flowchart of a manner for obtaining third information according to some other exemplary embodiments of this disclosure;

FIG. 8 is a schematic flowchart of a manner for determining a target region tag according to some other exemplary embodiments of this disclosure;

FIG. 9 is a schematic flowchart of operations performed on an on-chip buffer when there is no target feature value group in the on-chip buffer according to some exemplary embodiments of this disclosure;

FIG. 10 is a schematic flowchart of a manner for adding a target feature value group into an on-chip buffer according to some exemplary embodiments of this disclosure;

FIG. 11 is a schematic flowchart of a manner for calculating output feature data according to some exemplary embodiments of this disclosure;

DETAILED DESCRIPTION OF THE EMBODIMENTS

Figure 5:
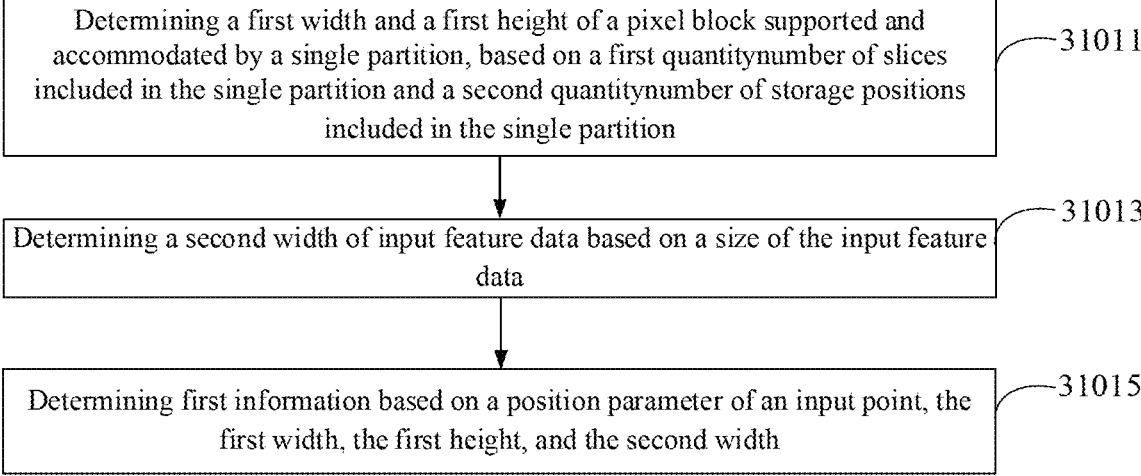
FIG. 5 is a schematic flowchart of a manner for obtaining first information according to some other exemplary embodiments of this disclosure.

To explain this disclosure, exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments.

It should be noted that unless otherwise specified, the scope of this disclosure is not limited by relative arrangement, numeric expressions, and numerical values of components and steps described in these embodiments.

Application Overview

Scenarios for calculating output feature data based on input feature data may include, but are not limited to the following scenarios.

Scenario 1: An image is preprocessed to obtain a preprocessed image. The preprocessing may include, but is not limited to, resize processing, rotation processing, projection processing, and distortion correction processing. The image before the preprocessing may be used as the input feature data, and the image after the preprocessing may be used as the output feature data.

Scenario 2: Pooling processing is performed on a feature map to obtain a pooled feature map. The pooling processing may include, but is not limited to maximum pooling processing and average pooling processing. The feature map before the pooling may be used as the input feature data, and the feature map after the pooling may be used as the output feature data.

It should be noted that fields such as image recognition, image detection, and image segmentation may involve scenarios of calculating the output feature data based on the input feature data. For the scenarios of calculating the output feature data based on the input feature data, how to ensure computational efficiency for the output feature data is an issue worthy of attention for a person skilled in the art.

Exemplary Method

FIG. 1 is a schematic flowchart of a method for performing an acceleration operation on feature data according to some exemplary embodiments of this disclosure. The method shown in FIG. 1 may be applied to an electronic device, such as an in-vehicle computing platform. The method shown in FIG. 1 may include steps 110, 120, 130, 140, 150, and 160.

Step 110. Determining, from input feature data, an input point corresponding to an output point in to-be-calculated output feature data.

Optionally, both the input feature data and the output feature data may be images or feature maps, so that both the input feature data and the output feature data may include a plurality of pixels. Each pixel in the output feature data may be used as an output point.

In step 110, the input point corresponding to the output point in the output feature data may be determined from the plurality of pixels included in the input feature data.

In some optional implementations of this disclosure, a coordinate $(x, y)$ of the output point and an offset $(\Delta x, \Delta y)$ of the output point that corresponds to input point may be determined. The offset $(\Delta x, \Delta y)$ may be given, or may be obtained through calculation. Respective coordinates of four input points corresponding to the output point may be determined based on the coordinate $(x, y)$ and the offset $(\Delta x, \Delta y)$ of the output point. The respective coordinates of the four input points may be $(x+\lfloor \Delta x \rfloor, y+\lfloor \Delta y \rfloor)$, $(x+\lceil \Delta x \rceil, y+\lfloor \Delta y \rfloor)$, $(x+\lfloor \Delta x \rfloor, y+\lceil \Delta y \rceil)$, and $(x+\lceil \Delta x \rceil, y+\lceil \Delta y \rceil)$, where $\lfloor \ \rfloor$ represents a rounded-down operation, and $\lceil \ \rceil$ represents a rounded-up operation. If it is assumed that the coordinate of the output point is $(0, 0)$ and the offset is $(0.4, 0.4)$, the coordinates of the four input points corresponding to the output point may be $(0, 0)$, $(1, 0)$, $(0, 1)$, and $(1, 1)$, respectively.

The case of four input points corresponding to the output points is described above. In some embodiments, the number of input points corresponding to the output points may also be 9, 16, or the like, which is not enumerated herein. For ease of understanding, in the embodiments of this disclosure, the case of four input points corresponding to the output points is used as an example for description.

Step 120. Determining a target region tag that matches the input point based on a position parameter of the input point.

Optionally, the position parameter of the input point may refer to a position coordinate of the input point. The position coordinate of the input point may be associated with a row and a column where the input point is located in the input feature data. For example, if the input point is located in a $j^{th}$ row and an $i^{th}$ column in the input feature data, the position coordinate of the input point may be (i−1, j−1) or (i, j).

Optionally, any region tag may be a tag corresponding to a specific region in the input feature data. Various pixels in that specific region may share the region tag, and these pixels may be considered as matching the region tag.

Step 130. Determining existence information on a target feature value group mapped by the target region tag in an on-chip buffer, where a feature value group mapped by any region tag includes feature values of a plurality of points in the input feature data that match the region tag.

Optionally, the on-chip buffer may be a cache.

Optionally, the feature value of a single point may be stored in a format of RGB0. In this case, the feature value of the single point may include pixel values of a R channel, a G channel, and a B channel, and transparency. R represents red, G represents green, and B represents blue. Alternatively, the feature value of a single point may be stored in a format of YUV0. In this case, the feature value of the single point may include values of a Y component, a U component, and a V component, and transparency. Y represents brightness, and U and V represent chromaticity.

In step 130, the target region tag may be used as index information to search the on-chip buffer to obtain the existence information, which may be used to characterize whether the target feature value group mapped by the target region tag exists in the on-chip buffer.

Step 140. Determining a target memory adapted to the existence information from the on-chip buffer and an on-chip main memory that stores the input feature data.

Optionally, the on-chip main memory may include, but is not limited to a static random-access memory (SRAM), a synchronous dynamic random-access memory (SDRAM), and the like.

If the existence information characterizes that the target feature value group exists in the on-chip buffer, it may be determined that the target memory adapted to the existence information is the on-chip buffer. If the existence information characterizes that the target feature value group does not exist in the on-chip buffer, it may be determined that the target memory adapted to the existence information is the on-chip main memory.

Step 150. Calculating a feature value of the output point based on a feature value of the input point in the target memory.

If the target memory is the on-chip buffer, it indicates that the feature value of the input point exists in the on-chip buffer. In this case, the on-chip buffer may be read to obtain the feature value of the input point, and the feature value of the output point may be calculated on this basis.

If the target memory is the on-chip main memory, it indicates that the feature value of the input point does not exist in the on-chip buffer. Since the input feature data is stored in the on-chip main memory, the feature value of the input point may exist in the on-chip main memory. In this case, the on-chip main memory may be read to obtain the feature value of the input point, and the feature value of the output point may be calculated on this basis.

Since there are four input points corresponding to the output point, in step 150, an operation may be performed on respective feature values of the four input points by using suitable operation logic and according to a specific scenario in which the output feature data needs to be calculated based on the input feature data, so as to obtain the feature value of the output point.

For example, if the specific scenario in which the output feature data needs to be calculated based on the input feature data is the scenario 1 described above, and the preprocessing involved in the scenario 1 includes scaling, an interpolation operation may be performed on the respective feature values of the four input points, so as to obtain the feature value of the output point. Optionally, the interpolation operation herein may be implemented through bilinear interpolation operators.

For another example, if the specific scenario in which the output feature data needs to be calculated based on the input feature data is the scenario 2 described above, and the pooling processing involved in the scenario 2 includes maximum pooling processing, a maximum value operation may be performed on the respective feature values of the four input points, so as to obtain the feature value of the output point. Optionally, the maximum value operation herein may be implemented through pooling operators.

For still another example, if the specific scenario in which the output feature data needs to be calculated based on the input feature data is the scenario 2 described above, and the pooling processing involved in the scenario 2 includes average pooling processing, an averaging operation may be performed on the respective feature values of the four input points, so as to obtain the feature value of the output point. Optionally, the averaging operation herein may be implemented through pooling operators.

In an optional example, the coordinates of the four input points corresponding to the output point are $(x+\lfloor \Delta x \rfloor, y+\lfloor \Delta y \rfloor)$, $(x+\lceil \Delta x \rceil, y+\lfloor \Delta y \rfloor)$, $(x+\lfloor \Delta x \rfloor, y+\lceil \Delta y \rceil)$, and $(x+\lceil \Delta x \rceil, y+\lceil \Delta y \rceil)$, respectively. The feature value of the input point with the coordinate of $(x+\lfloor \Delta x \rfloor, y+\lfloor \Delta y \rfloor)$ is represented by using $V_{topLeft}$. The feature value of the input point with the coordinate of $(x+\lceil \Delta x \rceil, y+\lfloor \Delta y \rfloor)$ is represented by using $V_{topRight}$. The feature value of the input point with the coordinate of $(x+\lfloor \Delta x \rfloor, y+\lceil \Delta y \rceil)$ is represented by using $V_{botLeft}$. The feature value of the input point with the coordinate of $(x+\lceil \Delta x \rceil, y+\lceil \Delta y \rceil)$ is represented by using $V_{botRight}$. The feature value of the output point is represented by using $V_{(x,y)}$.

If the specific scenario in which the output feature data needs to be calculated based on the input feature data is the scenario 1 described above, and the preprocessing involved in the scenario 1 includes scaling, the feature value of the output point may be calculated according to the following formulas:

$$V_{top} = (1 - x + \Delta x) * V_{topLeft} + (x - \Delta x) * V_{topRight}$$

$$V_{bot} = (1 - x + \Delta x) * V_{botLeft} + (x - \Delta x) * V_{botRight}$$

$$V_{(x,y)} = (1 - y + \Delta y) * V_{top} + (y - \Delta y) * V_{bot}$$

$V_{top}$ is a linear interpolation result of $V_{topLeft}$ and $V_{topRight}$, $V_{bot}$ is a linear interpolation result of $V_{botLeft}$ and $V_{botRight}$, and $V_{(x,y)}$ is a linear interpolation result of $V_{top}$ and $V_{bot}$.

If the specific scenario in which the output feature data needs to be calculated based on the input feature data is the scenario 2 described above, and the pooling processing involved in the scenario 2 includes maximum pooling processing, the feature value of the output point may be calculated according to the following formula:

$$V_{(x,y)} = \mathrm{MAX}(V_{topLeft}, V_{topRight}, V_{botLeft}, V_{botRight})$$

Step 160. Calculating the output feature data based on the feature value of the output point.

It should be noted that the output feature data may include a plurality of output points. For each of the plurality of output points, the corresponding feature value may be determined by using the manners described above. The output feature data may be calculated based on these determined feature values.

In the embodiments of this disclosure, the input point corresponding to the output point in the to-be-calculated output feature data may be determined from the input feature data; the target region tag that matches the input point may be determined based on the position parameter of the input point; with reference to the existence information on the target feature value group mapped by the target region tag in the on-chip buffer, the proper target memory may be determined from the on-chip buffer and the on-chip main memory that stores the input feature data; the feature value of the output point may be calculated based on the feature value of the input point in the target memory; and the output feature data may be calculated based on the feature value of the output point. In this way, through application of a tag strategy, the feature value of the input point may be preferentially read from the on-chip buffer. If there is no required feature value in the on-chip buffer, the feature value of the input point is read from the on-chip main memory. This is beneficial for improving reading efficiency for the input feature data, so as to implement an acceleration operation on the input feature data, thereby ensuring computational efficiency for the output feature data.

In some optional examples, the on-chip main memory may include a plurality of partitions (banks). Each partition may include a plurality of slices, and each slice may include a plurality of storage positions for storing feature values of all points in a lattice with a predetermined size in the input feature data. In other words, the on-chip main memory may include three storage levels, which respectively are a partition level, a slice level, and a storage position level.

Optionally, the on-chip main memory may include R partitions, and the R partitions in the on-chip main memory may be numbered starting from 0 according to an arithmetic sequence with a tolerance of 1.

Optionally, each partition may include S slices, and the S slices in each partition may be numbered starting from 0 according to an arithmetic sequence with a tolerance of 1.

Optionally, each slice may include M*M storage positions for storing feature values of all points in a lattice with a size of M*M in the input feature data. The M*M storage positions in each slice may be numbered starting from 0 according to an arithmetic sequence with a tolerance of 1.

In some embodiments, the R partitions in the on-chip main memory may be numbered starting from 1; and/or the S slices in each partition may be numbered starting from 1; and/or the M*M storage positions in each slice may be numbered starting from 1.

It should be noted that in the following text, at all other positions except position with additional descriptions, it is default that the R partitions in the on-chip main memory are numbered starting from 0, the S slices in each partition are numbered starting from 0, and the M*M storage positions in each slice are numbered starting from 0.

If it is assumed that a value of M is 2 and a value of S is 16, for the storage level of the on-chip main memory, reference may be made to FIG. 2. Using a slice 0 in a partition 0 as an example, the slice 0 may include four storage positions, where a storage position where (0, 0) is located is used for storing the feature value of the point with the coordinate of (0, 0) in the input feature data; a storage position where (0, 1) is located is used for storing the feature value of the point with the coordinate of (0, 1) in the input feature data; a storage position where (1, 0) is located is used for storing the feature value of the point with the coordinate of (1, 0) in the input feature data; and a storage position where (1, 1) is located is used for storing the feature value of the point with the coordinate of (1, 1) in the input feature data. If it is assumed that the feature value of each point is of 4 bytes, and the feature values of the 4 points are of 16 bytes in total, each slice may store 16 bytes of data. It may be learned from FIG. 2 that a single partition may store 16 consecutive 2*2 lattices.

In some optional examples, if the target memory is the on-chip main memory, as shown in FIG. 3, the method provided in the embodiments of this disclosure may include steps 310 and 320. Optionally, steps 310 and 320 may be performed before step 150 in this disclosure.

Step 310. Determining, based on the position parameter of the input point and a size of the input feature data, first address information used for indicating a partition, a slice and a storage position in which the input point is located in the on-chip main memory.

As described above, the position parameter of the input point may refer to the position coordinate of the input point. The position coordinate of the input point may include a horizontal coordinate and a vertical coordinate of the input point. The horizontal coordinate of the input point may be represented by using w, and the vertical coordinate of the input point may be represented by using h. In addition, the size of the input feature data may include a width and a height of the input feature data. The width of the input feature data may be represented by using W, and the height of the input feature data may be represented by using H.

Optionally, the first address information may include three components. A first component may be used to indicate the partition in which the input point is located in the on-chip main memory; a second component may be used to indicate the slice in which the input point is located in the on-chip main memory; and a third component may be used to indicate the storage position where the input point is located in the on-chip main memory. In this way, the first address information may be presented in the following form: (partition a, slice b, storage position c).

Step 320. Obtaining a feature value of the input point in the on-chip main memory based on the first address information.

If there is no target feature value group in the on-chip buffer, that is, the feature value of the input point cannot be obtained from the on-chip buffer, step 310 may be performed to determine the first address information. Subsequently, the partition indicated by the first address information may be searched from the R partitions included in the on-chip main memory, and then the slice indicated by the first address information may be searched from the S slices included in the partition. Subsequently, the storage position indicated by the first address information may be searched from the M*M storage positions included in the slice, and then the feature value of the input point may be read from the storage position.

In the embodiments of this disclosure, the on-chip main memory may store the input feature data according to the three storage levels (the partition level, the slice level, and the storage position level). In this way, when the feature value of the input point cannot be obtained from the on-chip buffer, it is merely needed to determine, for the output point, the first address information indicating the partition, the slice and the storage position in which the input point is located in the on-chip main memory, so that the required feature value may be quickly read from the on-chip main memory based on the first address information.

In some optional examples, as shown in FIG. 4, step 310 may include steps 3101, 3103, 3105, and 3107.

Step 3101. Determining first information used for indicating the partition in which the input point is located in the on-chip main memory based on the position parameter of the input point and the size of the input feature data.

In some optional implementations of this disclosure, as shown in FIG. 5, step 3101 may include steps 31011, 31013, and 31015.

Step 31011. Determining a first width and a first height of a pixel block accommodated by a single partition, based on a first number of slices included in the single partition and a second number of storage positions included in the single partition.

Optionally, S described above may be used as the first number, and M*M described above may be used as the second number. In this case, the first width of the pixel block accommodated by the single partition may be represented by using S*M, and the first height may be represented by using M.

Step 31013. Determining a second width of the input feature data based on the size of the input feature data.

Optionally, W described above may be used as the second width.

Step 31015. Determining the first information based on the position parameter of the input point, the first width, the first height, and the second width.

Optionally, the first information may be represented by using a ranking value of the partition to which the input point is located in the R partitions. If it is assumed that the ranking value of the partition in which the input point is located in the R partitions is represented by using B, and the horizontal coordinate and the vertical coordinate in the position parameter of the input point are respectively represented by using w and h, B may be calculated according to the following formula:

$$B = \text{floor} \left\{ \left[ \text{floor} \left( h/M \right) * W + w \right] / (S * M) \right\}.$$

floor represents a rounded-down operation.

In this way, in combination with algorithm logic such as a division operation, a rounded-down operation, a multiplication operation, and an addition operation, the first information used for indicating the partition in which the input point is located can be efficiently and reliably determined.

Step 3103. Determining second information used for indicating the slice in which the input point is located in the on-chip main memory, based on the position parameter of the input point, the size of the input feature data, and the first information.

Figure 6:
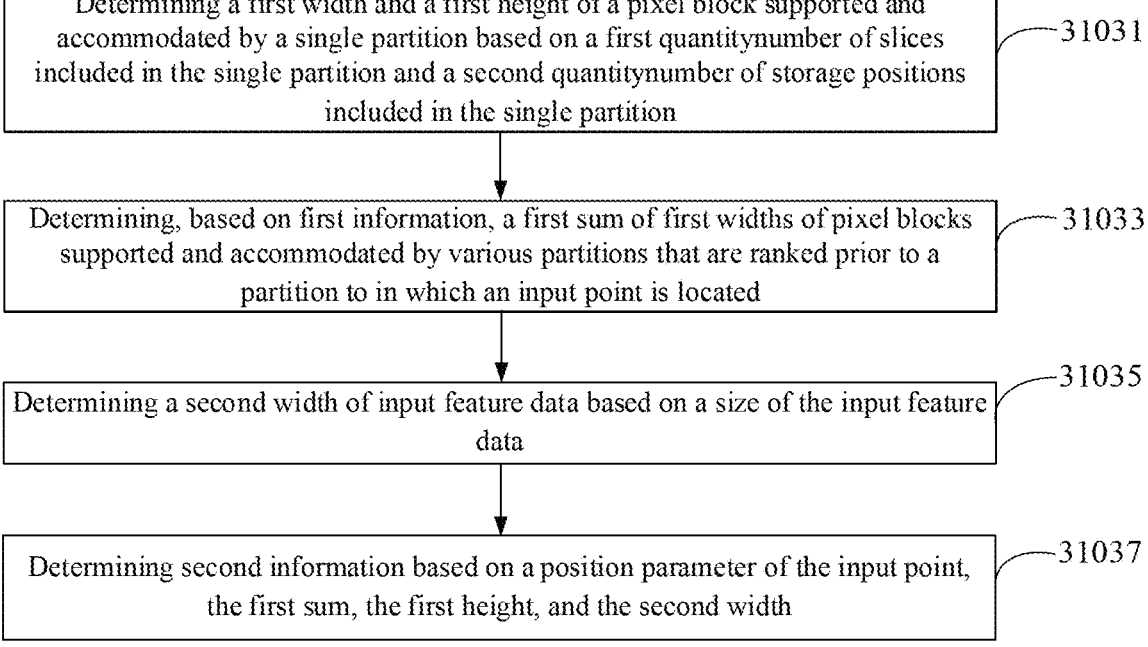
FIG. 6 is a schematic flowchart of a manner for obtaining second information according to some other exemplary embodiments of this disclosure.

In some optional implementations of this disclosure, as shown in FIG. 6, step 3103 may include steps 31031, 31033, 31035, and 31037.

Step 31031. Determining a first width and a first height of a pixel block accommodated by a single partition based on a first number of slices included in the single partition and a second number of storage positions included in the single partition.

Referring to the foregoing relevant description of step 31011, the first width may be represented by using S*M, and the first height may be represented by using M.

Step 31033. Determining, based on the first information, a first sum of first widths of pixel blocks accommodated by various partitions that are ranked prior to the partition in which the input point is located.

Assuming the first information is B described above, a total number of the partitions that are ranked prior to the partition in which the input point is located may be B. Since the first width of the pixel block accommodated by the single partition is S*M, the first sum in step 31033 may be represented by using B*(S*M).

Step 31035. Determining a second width of the input feature data based on the size of the input feature data.

Optionally, W described above may be used as the second width.

Step 31037. Determining the second information based on the position parameter of the input point, the first sum, the first height, and the second width.

Optionally, the second information may be represented by using a ranking value of the slice in which the input point is located in the partition in which the input point is located. If it is assumed that the ranking value of the slice in which the input point is located in the partition in which the input point is located is represented by using C, and the horizontal coordinate and the vertical coordinate in the position parameter of the input point are respectively represented by using w and h, C may be calculated according to the following formula:

$$C = \text{floor} \left\{ \left[ \text{floor} \left( h/M \right) * W + w - B * S * M \right] / M \right\}$$

In this way, in combination with algorithm logic such as a division operation, a rounded-down operation, a multiplication operation, an addition operation, and a subtraction operation, the second information used for indicating the slice in which the input point is located can be efficiently and reliably determined.

Step 3105. Determining third information used for indicating the storage position where the input point is located in the on-chip main memory based on the position parameter of the input point, the size of the input feature data, the first information, and the second information.

In some optional implementations of this disclosure, as shown in FIG. 7, step 3105 may include steps 31051, 31053, 31055, 31057, and 31059.

Step 31051. Determining a first width and a first height of a pixel block accommodated by a single partition based on a first number of slices included in the single partition and a second number of storage positions included in the single partition.

Referring to the foregoing relevant description of step 31011, the first width may be represented by using S*M, and the first height may be represented by using M.

Step 31053. Determining, based on the first information, a first sum of first widths of pixel blocks accommodated by various partitions that are ranked prior to the partition in which the input point is located.

Referring to the foregoing relevant description of step 31033, the first sum may be represented by using B*(S*M).

Step 31055. Determining, based on the second information, a second sum of second heights of pixel blocks accommodated by various slices that are ranked prior to the slice in which the input point is located in the partition in which the input point is located.

Assuming the second information is C described above, a total number of slices ranked prior to the slice in which the input point is located may be C. Since the second height of the pixel block accommodated by the single slice is M, the second sum in step 31055 may be represented by using C*M.

Step 31057. Determining a second width of the input feature data based on the size of the input feature data.

Optionally, W described above may be used as the second width.

Step 31059. Determining the third information based on the position parameter of the input point, the first sum, the second sum, the first height, and the second width.

Optionally, the third information may be represented by using a ranking value of the storage position where the input point is located in the slice in which the input point is located. If it is assumed that the ranking value of the storage position where the input point is located in the slice in which the input point is located is represented by using O, and the horizontal coordinate and the vertical coordinate in the position parameter of the input point are respectively represented by using w and h, O may be calculated according to the following formula:

$$O = \left[h - \mathrm{floor}\left(h/M\right)\right] * M + \mathrm{floor}\left(h/M\right) * W + w - B * S * M - C * M$$

In this way, through logical operations such as a division operation, a rounded-down operation, a multiplication operation, an addition operation, and a subtraction operation, the third information used for indicating the storage position where the input point is located can be efficiently and reliably determined.

Step 3107. Determining the first address information based on the first information, the second information, and the third information.

In step 3107, the first information, second information, and third information may be combined to obtain the first address information presented in a form of (partition a, slice b, storage position c). For example, the first address information may be in the following form: (B, C, O).

It should be pointed out that premise for the formulas described above for obtaining B, C, and O is: The R partitions are numbered starting from 0, the S slices in each partition are numbered starting from 0, and the M*M storage positions in each slice are numbered starting from 0. In specific implementation, the R partitions may also be numbered starting from 1 instead of 0. If it is assumed that the S slices in each partition and the M*M storage positions included in each slice are still numbered starting from 0, the formula for obtaining C may be modified to C=floor{[floor (h/M)*W+w−(B−1)*S*M]/M}. In addition, when the R partitions are numbered starting from 1, if it is assumed that the S slices in each partition and the M*M storage positions included in each slice are also numbered starting from 1, the formula for obtaining C may be modified to C=floor{[floor (h/M)*W+w−(B−1)*S*M]/M}+1, and the formula for obtaining O may be modified to O=[h−floor(h/M)]*M+floor (h/M)*W+w−B*S*M−(C−1)*M+1.

It should be noted that the position parameter of the input point and the size of the input feature data may be considered as basic reference information. The basic reference information may provide effective reference for the determining of the first information; the first information and the basic reference information together may provide effective reference for the determining of the second information; and the first information, the second information, and the basic reference information may together provide effective reference for the determining of the third information, so that the determined first information, second information, and third information are adapted to a position where the input point is located in the input feature data and to the size of the input feature data, thereby ensuring accuracy and reliability of the determined first information, second information, and third information. In this way, accuracy and reliability of the first address information obtained by combining the first information, the second information, and the third information can also be well ensured.

In some optional examples, as shown in FIG. 8, step 120 may include steps 1201, 1203, 1205, and 1207.

Step 1201. Determining a target horizontal coordinate and a target vertical coordinate of the input point based on the position parameter of the input point.

Optionally, w described above may be used as the target horizontal coordinate, and h described above may be used as the target vertical coordinate.

Step 1203. Determining a first tag parameter based on the target horizontal coordinate and a first preset value.

Optionally, step 1203 includes:

rounding down a ratio of the target horizontal coordinate to the first preset value to obtain the first tag parameter.

Since the target horizontal coordinate is represented by using w, if it is assumed that the first preset value is 2, the ratio of the target horizontal coordinate to the first preset value may be represented by using w/2. The first tag parameter obtained by rounding down the ratio of the target horizontal coordinate to the first preset value may be represented by using floor (w/2).

In this way, by using a division operation and a rounded-down operation, the first tag parameter can be efficiently and reliably obtained.

Step 1205. Determining a second tag parameter based on the target vertical coordinate and the first preset value.

Optionally, step 1205 includes:

rounding down a ratio of the target vertical coordinate to the first preset value to obtain the second tag parameter.

Since the target vertical coordinate is represented by using w, if it is assumed that the first preset value is 2, the ratio of the target vertical coordinate to the first preset value may be represented by using h/2. The second tag parameter obtained by rounding down the ratio of the target vertical coordinate to the first preset value may be represented by using floor (h/2).

In this way, by using a division operation and a rounded-down operation, the second tag parameter can be efficiently and reliably obtained.

Step 1207. Determining the target region tag based on the first tag parameter and the second tag parameter.

Optionally, the first tag parameter and the second tag parameter may be combined, and a combination result may be used as the target region tag. For example, the target region tag may be [floor (w/2), floor (h/2)]. Alternatively, the first tag parameter and the second tag parameter may be connected by using a preset symbol, and a connection result may be used as the target region tag. For example, the target region tag may be floor (w/2) & floor (h/2). In some embodiments, the target region tag may also be tag [floor (w/2), floor (h/2)]. Alternatively, the foregoing combination result or connection result may be encoded as binary data, and the binary data obtained though encoding may be used as the target region tag.

In this way, corresponding tag parameters are respectively determined for the target horizontal coordinate and the target vertical coordinate of the input point, and then the tag parameters respectively corresponding to the target horizontal coordinate and the target vertical coordinate are integrated, so that the target region tag that matches the input point can be efficiently and reliably obtained. Moreover, the target region tag may be shared by a plurality of points in the input feature data. For example, if the coordinate of the input point is (7, 7), the target region tag may be (3, 3). Obviously, the target region tag may also be shared by points with coordinates of (6, 6), (6, 7), and (7, 6). Therefore, the target feature value group may include the feature value of the input point, and feature values of the points with the coordinates of (6, 6), (6, 7), and (7, 6).

In some optional examples, as shown in FIG. 9, the method provided in the embodiments of this disclosure may further include steps 910 and 920. Optionally, step 910 may be performed when the target memory is the on-chip main memory.

Step 910. For another points among a plurality of points that match the target region tag except the input point, determining, based on position parameters of the another points and the size of the input feature data, second address information used for indicating a partition, a slice and a storage position in which the another points are located in the on-chip main memory Referring to the foregoing example again, the coordinate of the input point is (7, 7), and in the plurality of points that match the target region tag (3, 3), in addition to the input point, there are also the points with the coordinates of (6, 6), (6, 7), and (7, 6). Therefore, for the points with the coordinates of (6, 6), (6, 7), and (7, 6), the corresponding second address information may be determined separately. For a specific determining manner, reference may be made to the foregoing relevant description of the determining manner of the first address information, and details are not described herein.

Step 920. Obtaining feature values of the another points in the on-chip main memory based on the second address information to obtain the target feature value group including the feature value of the input point and the feature values of the another points, and adding the target feature value group to the on-chip buffer.

In step 920, the feature values of the points with the coordinates of (6, 6), (6, 7), and (7, 6) in the on-chip main memory may be obtained based on the second address information corresponding to the points with the coordinates of (6, 6), (6, 7), and (7, 6). For a specific obtaining manner, reference may be made to the foregoing relevant description of the manner of obtaining the feature value of the input point in the on-chip main memory, and details are not described herein. Subsequently, a target feature value group consisting of the feature values of the input point and the points with the coordinates of (6, 6), (6, 7), and (7, 6) may be added to the on-chip buffer.

By adding the target feature value group to the on-chip buffer, if it is required to obtain the feature values of the another points that share the target region tag with the input point in the following, the on-chip buffer may be directly read without obtaining the feature values from the on-chip main memory. In this way, the reading efficiency for the input feature data can be improved, thereby further ensuring the computational efficiency for the output feature data.

In some optional examples, as shown in FIG. 10, the method provided in the embodiments of this disclosure may further include steps 1010, 1020, 1030, and 1040. Optionally, a combination of steps 1010 to 1040 may be used as an optional implementation for adding the target feature value group to the on-chip buffer in step 920 of this disclosure.

Step 1010. Determining a numerical relationship between a number of feature value groups existing in the on-chip buffer and a preset number.

It should be noted that the preset number may be a maximum number of feature value groups that can be stored in the on-chip buffer. Optionally, the preset number may be 4, 6, or the like, which is not enumerated herein. The numerical relationship in step 1010 may refer to a magnitude relationship between the number of the feature value groups existing in the on-chip buffer and the preset number.

Step 1020. Determining usage information corresponding to each feature value group in the on-chip buffer if the numerical relationship meets a preset condition.

If the number of the feature value groups existing in the on-chip buffer is less than the preset number, it indicates that there are not a lot of feature value groups in the on-chip buffer and there is sufficient space in the on-chip buffer for storing new feature value groups. In this case, it may be determined that the numerical relationship in step 1010 does not meet the preset condition, and the target feature value group may be directly added to the on-chip buffer.

If the number of the feature value groups existing in the on-chip buffer is equal to the preset number, it indicates that there are a lot of feature value groups in the on-chip buffer and there is not enough space in the on-chip buffer for storing new feature value groups. In this case, it may be determined that the numerical relationship in step 1010 meets the preset condition, and the usage information corresponding to each feature value group in the on-chip buffer may be determined. The usage information corresponding to any feature value group may be used to characterize a number of times, frequency, and the like for which the feature value group has been accessed in a recent period.

In some embodiments, the numerical relationship in step 1010 may also refer to a ratio of the number of the feature value groups existing in the on-chip buffer to the preset number. In this case, if the ratio is equal to a preset ratio (such as 1), it may be determined that the numerical relationship in step 1010 meets the preset condition.

Step 1030. Filtering, based on the usage information, a feature value group meeting a preset deletion condition from the on-chip buffer.

In step 1030, referring to the usage information corresponding to each feature value group in the on-chip buffer, a feature value group with least access times in the recent period may be filtered out from the on-chip buffer to serve as the feature value group that meets the preset deletion condition. If there is at least one feature value group with least access times in the recent period, a feature value group may be randomly filtered out from the at least one feature value group to serve as the feature value group that meets the preset deletion condition.

Step 1040. Replacing the feature value group meeting a preset deletion condition in the on-chip buffer with the target feature value group.

In step 1040, the feature value group meeting the preset deletion condition may be directly replaced with the target feature value group, so as to add the target feature value group to the on-chip buffer.

It should be noted that storage space of the on-chip buffer is usually limited. For example, the on-chip buffer may store a preset number of feature value groups at most. On this basis, in the embodiments of this disclosure, the feature value group may be replaced according to a least frequently used (LFU) strategy. In this way, on one hand, successful addition of the target feature value group may be ensured, and on the other hand, it may be ensured that feature value groups that would be used are stored in the on-chip buffer as possible, thereby avoiding invalid storage.

In some optional examples, as shown in FIG. 11, the method provided in the embodiments of this disclosure may further include steps 1110, 1120, and 1130.

Step 1110. Determining a plurality of calculation tasks, where each calculation task is used to calculate feature values of some output points in the to-be-calculated output feature data.

Optionally, the to-be-calculated output feature data may be divided into N pixel blocks. N may be an integer greater than or equal to 2. For example, N may be 8 or 16. Sizes of different pixel blocks may be the same or different. Each pixel block may correspond to one calculation task, so that there may be a total of N calculation tasks. The calculation task corresponding to each pixel block may refer to a task used for calculating a feature value of each output point in the pixel block.

Step 1120. Assigning different calculation tasks to different calculation components.

Optionally, the calculation component may include an arithmetic and logic unit (ALU).

In step 1120, the N calculation tasks may be assigned to N calculation components randomly or according to a set rule, provided that the N calculation tasks are in one-to-one correspondence to the N calculation components. Optionally, each of the N calculation components may have an independent on-chip buffer.

Step 1130. Controlling different calculation components to concurrently execute corresponding calculation tasks.

In step 1130, each of the N calculation components may complete the corresponding calculation task through an independent thread. For example, one of the N calculation components may calculate a feature value of a certain output point in a pixel block 1 through a thread 1, while another one in the N calculation components may calculate a feature value of a certain output point in a pixel block 2 through a thread 2.

In the embodiments of this disclosure, different calculation components may concurrently execute calculation tasks, thus further ensuring the computational efficiency for the output feature data.

Figure 12:
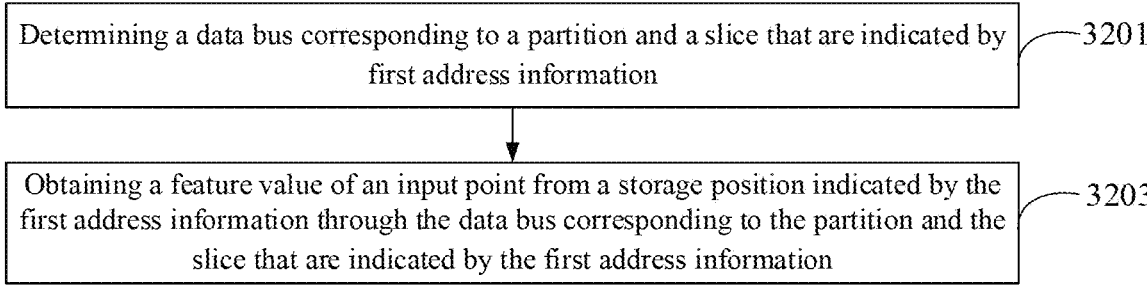
FIG. 12 is a schematic flowchart of a manner for obtaining a feature value of an input point in a target memory according to some other exemplary embodiments of this disclosure.

In some optional examples, as shown in FIG. 12, step 320 may include steps 3201 and 3203.

Step 3201. Determining a data bus corresponding to the partition and the slice that are indicated by the first address information.

As described above, the on-chip main memory may include R partitions, each of which may include S slices. For each of the N calculation components, R*S data buses may be set. Through the R*S data buses, the calculation component may be connected to each slice in each partition, separately. If it is assumed that the output point is located on a pixel block corresponding to the calculation component, a data bus used to connect the calculation component to the slice indicated by the first address information may be used as the data bus in step 3201.

Step 3203. Obtaining the feature value of the input point from the storage position indicated by the first address information through the data bus corresponding to the partition and the slice that are indicated by the first address information.

In step 3203, data may be read through the data bus determined in step 3201, so as to obtain a feature value at the storage position indicated by the first address information. This feature value is the feature value of the input point.

In the embodiments of this disclosure, different calculation components may concurrently execute corresponding calculation tasks. For each calculation component, during a calculation process, a proper data bus may be selected from a plurality of data buses that are set for that calculation component, so as to obtain the feature value. This is beneficial for avoiding read/write conflicts between different calculation components.

Figure 13A:
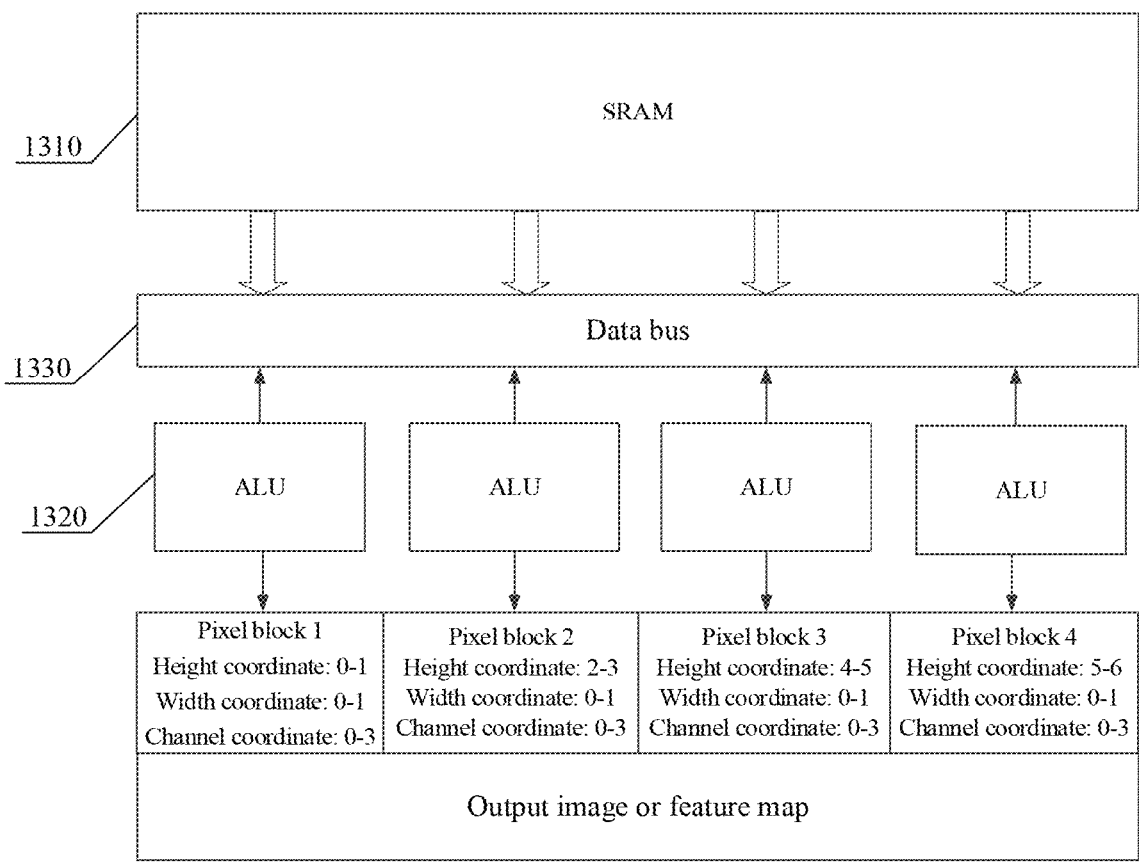
FIG. 13A is a conceptual diagram of a manner for calculating output feature data according to some exemplary embodiments of this disclosure.

In some optional examples, as shown in FIG. 13A, the input feature data may be an input image or a feature map, and may be stored in an SRAM 1310. The output feature data may be an output image or a feature map. As a calculation component, each ALU 1320 may calculate feature values of all output points in a pixel block with a width of 2, a height of 2, and 4 channels. Optionally, each ALU 1320 may obtain a feature value of a corresponding input point from the SRAM 1310 through a data bus 1330, and calculate a feature value of a corresponding output point accordingly to complete a calculation task.

Figure 13B:
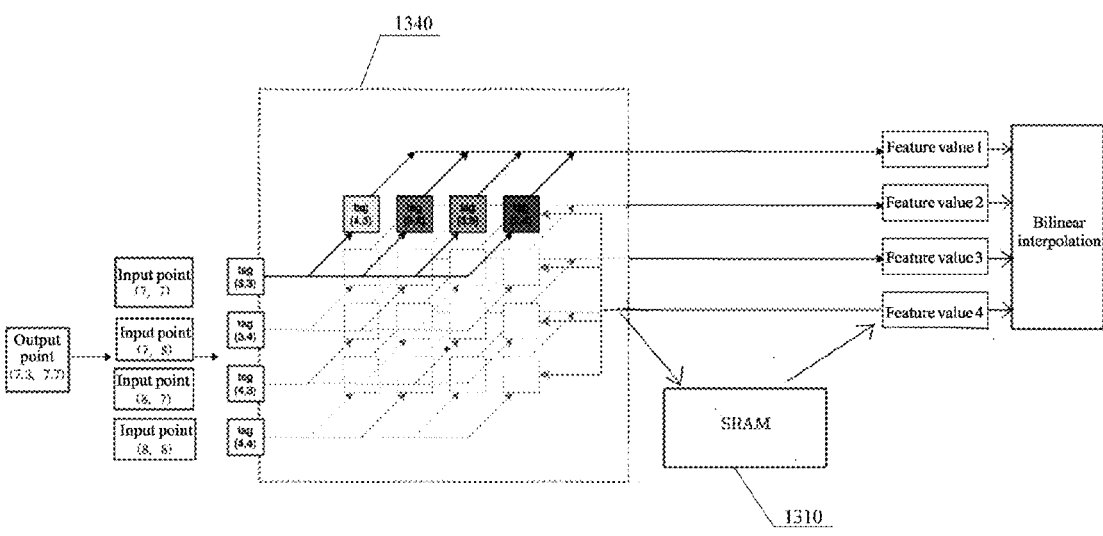
FIG. 13B is a conceptual diagram of a manner for calculating output feature data according to some other exemplary embodiments of this disclosure.

In some optional examples, as shown in FIG. 13B, the coordinate of the output point may be (7.3, 7.7), and the coordinates of the four input points corresponding to the output point may be (7, 7), (7, 8), (8, 7), and (8, 8), respectively. Subsequently, target region tags that respectively match the four input points may be calculated, and the determined target region tags may be sequentially a tag (3, 3), a tag (3, 4), a tag (4, 3), and a tag (4, 4).

It is assumed that a calculation task for a feature value of the output point with the coordinate of (7.3, 7.7) is assigned to a target ALU (which may be a certain ALU 1320 in FIG. 13A). Since the target region tag that matches the input point with the coordinate of (7, 7) is the tag (3, 3), and in FIG. 13B, feature value groups corresponding to the tag (4, 3), the tag (3, 4), the tag (3, 3), and the tag (2, 4) are cached in an on-chip buffer 1340 of the target ALU, a feature value of the input point with the coordinate of (7, 7) may be directly obtained from the on-chip buffer 1340 of the target ALU. If it is assumed that in some cases, the feature value group corresponding to the tag (3, 3) is not cached in the on-chip buffer 1340 of the target ALU, the feature value group corresponding to the tag (3, 3) may be obtained from the SRAM 1310, and may be stored in the on-chip buffer 1340 of the target ALU, so that the feature value of the input point with the coordinate of (7, 7) may be determined. Feature values of another input points may be determined in a similar manner, and details are not described herein. If it is assumed that the feature values of the four input points sequentially are a feature value 1, a feature value 2, a feature value 3, and a feature value 4, subsequently, the target ALU may perform bilinear interpolation on the feature values 1 to 4 to obtain the feature value of the output point.

Figure 14:
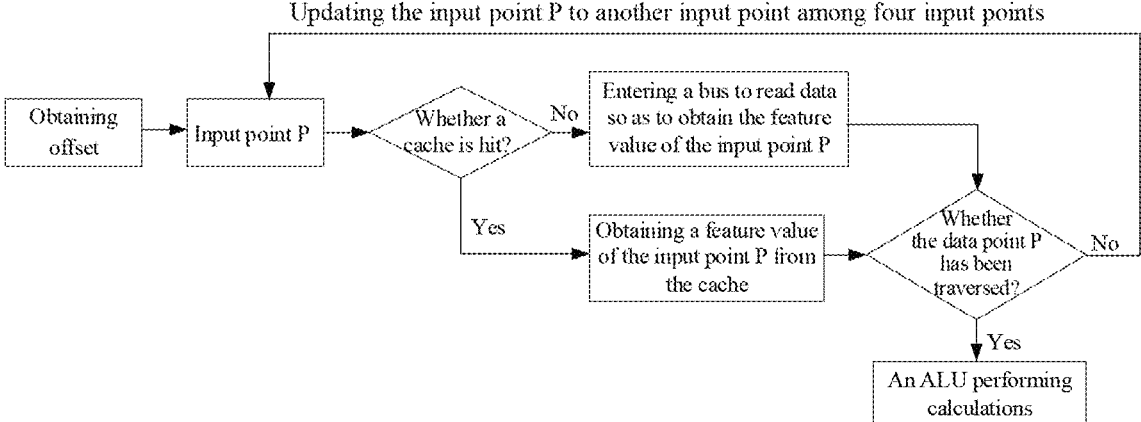
FIG. 14 is a schematic flowchart of a manner for obtaining a feature value of an input point in a target memory according to still some other exemplary embodiments of this disclosure.

In some optional examples, as shown in FIG. 14, offset corresponding to the output point may be obtained, and the four input points corresponding to the output point may be determined based on the coordinate of the output point and the offset corresponding to the output point. Subsequently, one of the four input points may be used as an input point P, and whether the cache is hit is queried for the input point P (equivalent to determining the existence information on the target feature value group in the on-chip buffer). If a query result is that the cache is hit (equivalent to that the target feature value group is cached in the on-chip buffer), a feature value of the input point P may be obtained from the cache. If the query result is that the cache is not hit (equivalent to that the target feature value group is not cached in the on-chip buffer), the feature value of the input point P may be obtained from the SRAM through the data bus. Subsequently, it may be determined whether the input point P has been traversed (that is, determining whether each of the four input points has been used as the input point P). If the traversal is not completed, the input point P may be updated to another input point in the four input points. If the traversal is completed, bilinear interpolation may be performed on the feature values of the four input points by using the ALU. Optionally, the SRAM, the ALU, and the cache may all be deployed on neural network accelerator for example, on convolutional neural network accelerator In view of the above, in the embodiments of this disclosure, through setting of a plurality of ALUs, concurrent calculation may be implemented with low hardware area overhead and low costs through a single instruction multiple thread (SIMT), thereby effectively ensuring the computational efficiency for the output feature data. A plurality of multiple data buses are set for each ALU and the LFU strategy is introduced, so that read/write conflicts between different ALUs may be avoided and bandwidth may be saved.

Exemplary Apparatus

Figure 15:
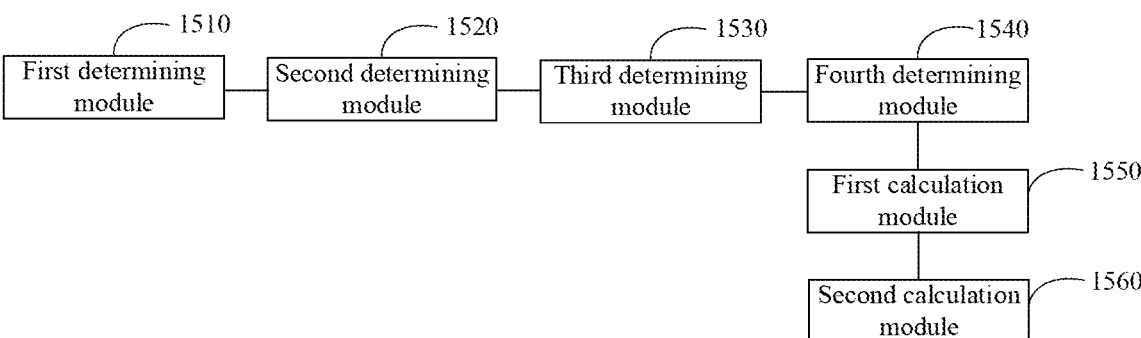
FIG. 15 is a schematic diagram of a structure of an apparatus for performing an acceleration operation on feature data according to some exemplary embodiments of this disclosure.

FIG. 15 is a schematic diagram of a structure of an apparatus for performing an acceleration operation on feature data according to some exemplary embodiments of this disclosure. The apparatus shown in FIG. 15 includes:

a first determining module 1510 configured to determine, from input feature data, an input point corresponding to an output point in to-be-calculated output feature data;

a second determining module 1520 configured to determine a target region tag that matches the input point based on a position parameter of the input point determined by the first determining module 1510;

a third determining module 1530 configured to determine existence information on a target feature value group mapped by the target region tag in an on-chip buffer determined by the second determining module 1520, where a feature value group mapped by any region tag includes feature values of a plurality of points in the input feature data that match the region tag;

a fourth determining module 1540 configured to determine a target memory adapted to the existence information determined by the third determining module 1530 from the on-chip buffer and an on-chip main memory that stores the input feature data;

a first calculation module 1550 configured to calculate a feature value of the output point based on a feature value of the input point in the target memory determined by the fourth determining module 1540; and a second calculation module 1560 configured to calculate the output feature data based on the feature value of the output point calculated by the first calculation module 1550.

Figure 16:
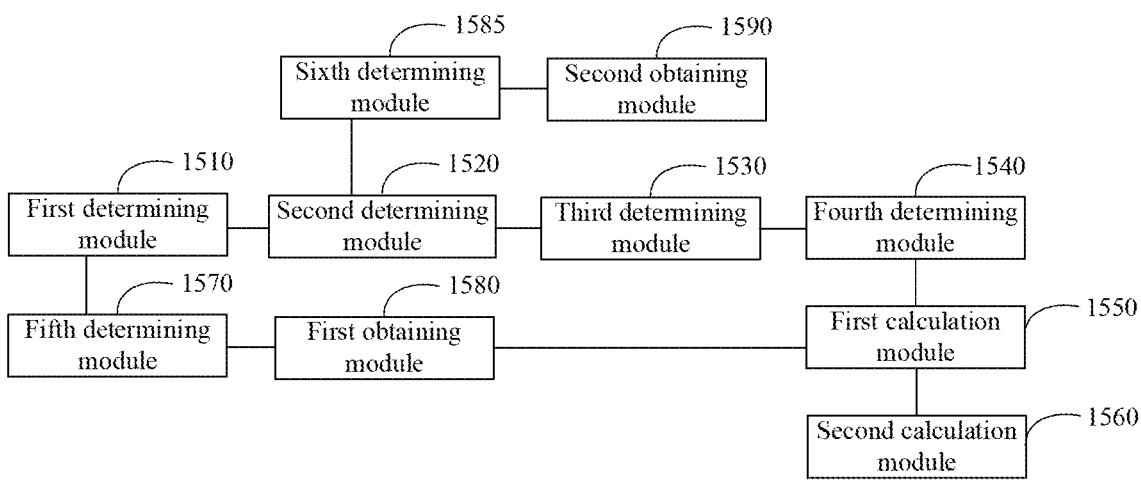
FIG. 16 is a schematic diagram of a structure of an apparatus for performing an acceleration operation on feature data according to some other exemplary embodiments of this disclosure.

In some optional examples, if the target memory is the on-chip main memory, as shown in FIG. 16, the apparatus provided in the embodiments of this disclosure further includes:

a fifth determining module 1570 configured to determine, based on the position parameter of the input point determined by the first determining module 1510 and a size of the input feature data, first address information used for indicating a partition and a slice in which the input point is located, and a storage position where the input point is located in the on-chip main memory before the first calculation module 1550 calculates the feature value of the output point based on the feature value of the input point in the target memory determined by the fourth determining module 1540; and a first obtaining module 1580 configured to obtain a feature value of the input point in the on-chip main memory based on the first address information determined by the fifth determining module 1570.

In some optional examples, the fifth determining module 1570 includes:

a first determining submodule configured to determine first information used for indicating the partition in which the input point is located in the on-chip main memory based on the position parameter of the input point and the size of the input feature data;

a second determining submodule configured to determine second information used for indicating the slice in which the input point is located in the on-chip main memory based on the position parameter of the input point, the size of the input feature data, and the first information determined by the first determining submodule;

a third determining submodule configured to determine third information used for indicating the storage position where the input point is located in the on-chip main memory based on the position parameter of the input point, the size of the input feature data, the first information determined by the first determining submodule, and the second information determined by the second determining submodule; and a fourth determining submodule configured to determine the first address information based on the first information determined by the first determining submodule, the second information determined by the second determining submodule, and the third information determined by the third determining submodule.

In some optional examples, the first determining submodule includes:

a first determining unit configured to determine a first width and a first height of a pixel block accommodated by a single partition based on a first number of slices included in the single partition and a second number of storage positions included in the single partition;

a second determining unit configured to determine a second width of the input feature data based on the size of the input feature data; and a third determining unit configured to determine the first information based on the position parameter of the input point, the first width and the first height that are determined by the first determining unit, and the second width determined by the second determining unit.

In some optional examples, the second determining submodule includes:

a fourth determining unit configured to determine a first width and a first height of a pixel block accommodated by a single partition based on a first number of slices included in the single partition and a second number of storage positions included in the single partition;

a fifth determining unit configured to determine, based on the first information determined by the first determining submodule, a first sum of first widths of pixel blocks accommodated by various partitions that are ranked prior to the partition in which the input point is located;

a sixth determining unit configured to determine a second width of the input feature data based on the size of the input feature data; and a seventh determining unit configured to determine the second information based on the position parameter of the input point, the first sum determined by the fifth determining unit, the first height determined by the fourth determining unit, and the second width determined by the sixth determining unit.

In some optional examples, the third determining submodule includes:

an eighth determining unit configured to determine a first width and a first height of a pixel block accommodated by a single partition based on a first number of slices included in the single partition and a second number of storage positions included in the single partition;

a ninth determining unit configured to determine, based on the first information determined by the first determining submodule, a first sum of first widths of pixel blocks accommodated by various partitions that are ranked prior to the partition in which the input point is located;

a tenth determining unit configured to determine, based on the second information determined by the second determining submodule, a second sum of second heights of pixel blocks accommodated by various slices that are ranked prior to the slice in which the input point is located in the partition in which the input point is located;

an eleventh determining unit configured to determine a second width of the input feature data based on the size of the input feature data; and a twelfth determining unit configured to determine the third information based on the position parameter of the input point, the first sum determined by the ninth determining unit, the second sum determined by the tenth determining unit, the first height determined by the eighth determining unit, and the second width determined by the eleventh determining unit.

In some optional examples, as shown in FIG. 16, the apparatus provided in the embodiments of this disclosure further includes:

a sixth determining module 1585 configured to determine, for another points among a plurality of points that match the target region tag except the input point determined by the second determining module 1520 and based on position parameters of the another points and the size of the input feature data, second address information used for indicating a partition, a slice and a storage position in which the another points are located in the on-chip main memory; and a second obtaining module 1590 configured to obtain feature values of the another points in the on-chip main memory based on the second address information determined by the sixth determining module 1585 to obtain the target feature value group including the feature value of the input point and the feature values of the another points, and add the target feature value group to the on-chip buffer.

In some optional examples, the second obtaining module 1590 includes:

a fifth determining submodule configured to determine a numerical relationship between a number of feature value groups existing in the on-chip buffer and a preset number;

a sixth determining submodule configured to determine usage information corresponding to each feature value group in the on-chip buffer if the numerical relationship determined by the fifth determining submodule meets a preset condition;

a filtering submodule configured to filter, based on the usage information, a feature value group meeting a preset deletion condition from the on-chip buffer; and a replacement submodule configured to replace a feature value group meeting the preset deletion condition in the on-chip buffer that is deleted by the filtering submodule with the target feature value group.

In some optional examples, the first obtaining module 1580 includes:

a seventh determining submodule configured to determine a data bus corresponding to the partition and the slice that are indicated by the first address information determined by the fifth determining module 1570; and an obtaining submodule configured to obtain, by using the data bus determined by the seventh determining submodule, the feature value of the input point from the storage position indicated by the first address information that is determined by the fifth determining module 1570.

In some optional examples, the second determining module 1520 includes:

an eighth determining submodule configured to determine a target horizontal coordinate and a target vertical coordinate of the input point based on the position parameter of the input point determined by the first determining module 1510;

a ninth determining submodule configured to determine a first tag parameter based on the target horizontal coordinate determined by the eighth determining submodule and a first preset value;

a tenth determining submodule configured to determine a second tag parameter based on the target vertical coordinate determined by the eighth determining submodule and the first preset value; and an eleventh determining submodule configured to determine the target region tag based on the first tag parameter determined by the ninth determining submodule and the second tag parameter determined by the tenth determining submodule.

Figure 17:
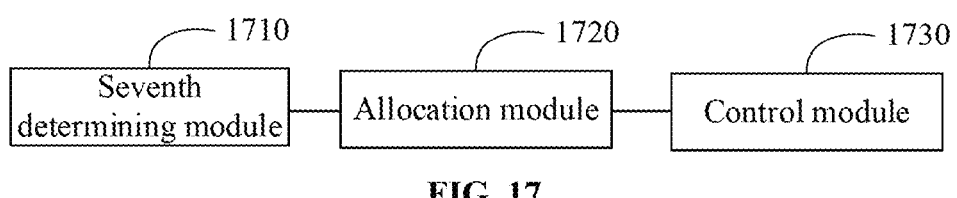
FIG. 17 is a schematic diagram of modules involved in calculation of output feature data according to some exemplary embodiments of this disclosure.

In some optional examples, as shown in FIG. 17, the apparatus provided in the embodiments of this disclosure further includes:

a seventh determining module 1710 configured to determine a plurality of calculation tasks, where each calculation task is used to calculate feature values of some output points in the to-be-calculated output feature data;

an allocation module 1720 configured to assign different calculation tasks determined by the seventh determining module 1710 to different calculation components; and a control module 1730 configured to control different calculation components to concurrently execute corresponding calculation tasks that are allocated by the allocation module 1720.

In the apparatus in this disclosure, various optional embodiments, optional implementations, and optional examples described above may be flexibly selected and combined according to requirements, so as to implement corresponding functions and effects. These are not enumerated in this disclosure.

Exemplary Electronic Device

Figure 18:
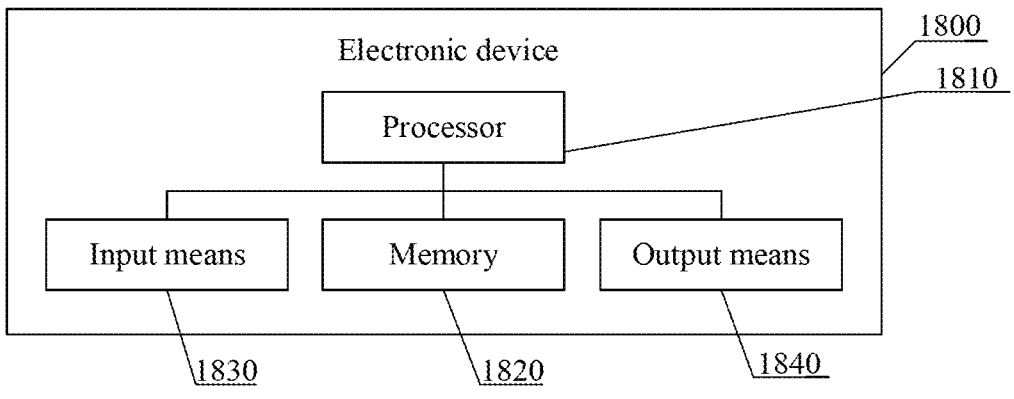
FIG. 18 is a diagram of a structure of an electronic device according to some exemplary embodiment of this disclosure.

FIG. 18 is a block diagram of an electronic device according to an embodiment of this disclosure. An electronic device 1800 includes one or more processors 1810 and a memory 1820.

The processor 1810 may be a central processing unit (CPU) or another form of processing unit having a data processing capability and/or an instruction execution capability, and may control another component in the electronic device 1800 to implement a desired function.

The memory 1820 may include one or more computer program products. The product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 1810 may execute one or more of the program instructions to implement the method according to various embodiments of this disclosure that are described above and/or other desired functions.

In an example, the electronic device 1800 may further include an input means 1830 and an output means 1840. These components are connected to each other through a bus system and/or another form of connection mechanism (not shown).

The input means 1830 may further include, for example, a keyboard and a mouse.

The output means 1840 may output various information to the outside, and may include, for example, a display, a speaker, a printer, a communication network, and a remote output device connected by the communication network.

Certainly, for simplicity, FIG. 18 shows only some of components in the electronic device 1800 that are related to this disclosure, and components such as a bus and an input/output interface are omitted. In addition, according to specific application situations, the electronic device 1800 may further include any other appropriate components.

Exemplary Computer Program Product and Computer Readable Storage Medium

In addition to the foregoing method and device, the embodiments of this disclosure may also relate to a computer program product, which includes computer program instructions. When the instructions are run by a processor, the processor is enabled to perform the steps, of the method according to the embodiments of this disclosure, that are described in the "exemplary method" part of this specification.

The computer program product may be program code, written in one or any combination of a plurality of programming languages, that is configured to perform the operations in the embodiments of this disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium, which stores computer program instructions. When the computer program instructions are run by the processor, the processor is enabled to perform the steps, of the method according to the embodiments of this disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, advantages, superiorities, and effects mentioned in this disclosure are merely examples but are not for limitation, and it cannot be considered that these advantages, superiorities, and effects are necessary for each embodiment of this disclosure. Specific details described above are merely for examples and for ease of understanding, rather than limitations. The details described above do not limit that this disclosure must be implemented by using the foregoing specific details.

A person skilled in the art may make various modifications and variations to this disclosure without departing from the spirit and the scope of this disclosure. In this way, if these modifications and variations of this application fall within the scope of the claims and equivalent technologies of the claims of this disclosure, this disclosure also intends to include these modifications and variations.

What is claimed is:

1. A method for performing an acceleration operation on feature data, comprising:

determining, from input feature data, an input point corresponding to an output point in to-be-calculated output feature data;

determining a target region tag that matches the input point based on a position parameter of the input point;

determining existence information on a target feature value group mapped by the target region tag in an on-chip buffer, wherein a feature value group mapped by any region tag comprises feature values of a plurality of points in the input feature data that match the region tag;

determining a target memory adapted to the existence information from the on-chip buffer and an on-chip main memory that stores the input feature data;

calculating a feature value of the output point based on a feature value of the input point in the target memory; and calculating the output feature data based on the feature value of the output point.

2. The method according to claim 1, wherein if the target memory is the on-chip main memory, before the calculating a feature value of the output point based on a feature value of the input point in the target memory, the method further comprises:

determining, based on the position parameter of the input point and a size of the input feature data, first address information used for indicating a partition, a slice and a storage position in which the input point is located in the on-chip main memory; and obtaining a feature value of the input point in the on-chip main memory based on the first address information.

3. The method according to claim 2, wherein the determining, based on the position parameter of the input point and a size of the input feature data, first address information used for indicating a partition, a slice and a storage position in which the input point is located in the on-chip main memory; comprises:

determining first information used for indicating the partition in which the input point is located in the on-chip main memory based on the position parameter of the input point and the size of the input feature data;

determining second information used for indicating the slice in which the input point is located in the on-chip main memory based on the position parameter of the input point, the size of the input feature data, and the first information;

determining third information used for indicating the storage position where the input point is located in the on-chip main memory based on the position parameter of the input point, the size of the input feature data, the first information, and the second information; and determining the first address information based on the first information, the second information, and the third information.

4. The method according to claim 3, wherein the determining first information used for indicating the partition in which the input point is located in the on-chip main memory based on the position parameter of the input point and the size of the input feature data comprises:

determining a first width and a first height of a pixel block accommodated by a single partition, based on a first number of slices included in the single partition and a second number of storage positions included in the single partition;

determining a second width of the input feature data based on the size of the input feature data; and determining the first information based on the position parameter of the input point, the first width, the first height, and the second width.

5. The method according to claim 3, wherein the determining second information used for indicating the slice in which the input point is located in the on-chip main memory based on the position parameter of the input point, the size of the input feature data, and the first information comprises:

determining a first width and a first height of a pixel block accommodated by a single partition based on a first number of slices included in the single partition and a second number of storage positions included in the single partition;

determining, based on the first information, a first sum of first widths of pixel blocks accommodated by various partitions that are ranked prior to the partition in which the input point is located;

determining a second width of the input feature data based on the size of the input feature data; and determining the second information based on the position parameter of the input point, the first sum, the first height, and the second width.

6. The method according to claim 3, wherein the determining third information used for indicating the storage position where the input point is located in the on-chip main memory based on the position parameter of the input point, the size of the input feature data, the first information, and the second information comprises:

determining a first width and a first height of a pixel block accommodated by a single partition based on a first number of slices included in the single partition and a second number of storage positions included in the single partition;

determining, based on the first information, a first sum of first widths of pixel blocks accommodated by various partitions that are ranked prior to the partition in which the input point is located;

determining, based on the second information, a second sum of second heights of pixel blocks accommodated by various slices that are ranked prior to the slice in which the input point is located in the partition in which the input point is located;

determining a second width of the input feature data based on the size of the input feature data; and determining the third information based on the position parameter of the input point, the first sum, the second sum, the first height, and the second width.

7. The method according to claim 2, further comprising:

for another points among a plurality of points that match the target region tag except the input point, determining, based on position parameters of the another points and the size of the input feature data, second address information used for indicating a partition, a slice and a storage position in which the another points are located in the on-chip main memory; and obtaining feature values of the another points in the on-chip main memory, based on the second address information, to obtain the target feature value group comprising the feature value of the input point and the feature values of the another points, and adding the target feature value group to the on-chip buffer.

8. The method according to claim 7, wherein the adding the target feature value group to the on-chip buffer comprises:

determining a numerical relationship between a number of feature value groups existing in the on-chip buffer and a preset number;

if the numerical relationship meets a preset condition, determining usage information corresponding to each feature value group in the on-chip buffer;

filtering, based on the usage information, a feature value group meeting a preset deletion condition from the on-chip buffer; and replacing the feature value group meeting the preset deletion condition in the on-chip buffer with the target feature value group.

9. The method according to claim 2, wherein the obtaining a feature value of the input point in the on-chip main memory based on the first address information comprises:

determining a data bus corresponding to the partition and the slice that are indicated by the first address information; and obtaining the feature value of the input point from the storage position indicated by the first address information through the data bus.

10. The method according to claim 1, wherein the determining, based on a position parameter of the input point, a target region tag that matches the input point comprises:

determining a target horizontal coordinate and a target vertical coordinate of the input point based on the position parameter of the input point;

determining a first tag parameter based on the target horizontal coordinate and a first preset value;

determining a second tag parameter based on the target vertical coordinate and the first preset value; and determining the target region tag based on the first tag parameter and the second tag parameter.

11. A computer readable non-transitory storage medium with a computer program stored thereon, which is used for implementing the following steps:

determining, from input feature data, an input point corresponding to an output point in to-be-calculated output feature data;

determining a target region tag that matches the input point based on a position parameter of the input point;

determining existence information on a target feature value group mapped by the target region tag in an on-chip buffer, wherein a feature value group mapped by any region tag comprises feature values of a plurality of points in the input feature data that match the region tag;

determining a target memory adapted to the existence information from the on-chip buffer and an on-chip main memory that stores the input feature data;

calculating a feature value of the output point based on a feature value of the input point in the target memory; and calculating the output feature data based on the feature value of the output point.

12. An electronic device, comprising:

a processor; and a memory configured to store a processor-executable instruction, wherein the processor is configured to read the executable instruction from the memory, and execute the instruction to implement the following steps:

determining, from input feature data, an input point corresponding to an output point in to-be-calculated output feature data;

determining a target region tag that matches the input point based on a position parameter of the input point;

determining existence information on a target feature value group mapped by the target region tag in an on-chip buffer, wherein a feature value group mapped by any region tag comprises feature values of a plurality of points in the input feature data that match the region tag;

determining a target memory adapted to the existence information from the on-chip buffer and an on-chip main memory that stores the input feature data;

calculating a feature value of the output point based on a feature value of the input point in the target memory; and calculating the output feature data based on the feature value of the output point.

13. The electronic device according to claim 12, wherein if the target memory is the on-chip main memory, before the calculating a feature value of the output point based on a feature value of the input point in the target memory, the method further comprises:

determining, based on the position parameter of the input point and a size of the input feature data, first address information used for indicating a partition, a slice and a storage position in which the input point is located in the on-chip main memory; and obtaining a feature value of the input point in the on-chip main memory based on the first address information.

14. The electronic device according to claim 13, wherein the determining, based on the position parameter of the input point and a size of the input feature data, first address information used for indicating a partition, a slice and a storage position in which the input point is located in the on-chip main memory; comprises:

determining first information used for indicating the partition in which the input point is located in the on-chip main memory based on the position parameter of the input point and the size of the input feature data;

determining second information used for indicating the slice in which the input point is located in the on-chip main memory based on the position parameter of the input point, the size of the input feature data, and the first information;

determining third information used for indicating the storage position where the input point is located in the on-chip main memory based on the position parameter of the input point, the size of the input feature data, the first information, and the second information; and determining the first address information based on the first information, the second information, and the third information.

15. The electronic device according to claim 14, wherein the determining first information used for indicating the partition in which the input point is located in the on-chip main memory based on the position parameter of the input point and the size of the input feature data comprises:

determining a first width and a first height of a pixel block accommodated by a single partition, based on a first number of slices included in the single partition and a second number of storage positions included in the single partition;

determining a second width of the input feature data based on the size of the input feature data; and determining the first information based on the position parameter of the input point, the first width, the first height, and the second width.

16. The electronic device according to claim 14, wherein the determining second information used for indicating the slice in which the input point is located in the on-chip main memory based on the position parameter of the input point, the size of the input feature data, and the first information comprises:

determining a first width and a first height of a pixel block accommodated by a single partition based on a first number of slices included in the single partition and a second number of storage positions included in the single partition;

determining, based on the first information, a first sum of first widths of pixel blocks accommodated by various partitions that are ranked prior to the partition in which the input point is located;

determining a second width of the input feature data based on the size of the input feature data; and determining the second information based on the position parameter of the input point, the first sum, the first height, and the second width.

17. The electronic device according to claim 14, wherein the determining third information used for indicating the storage position where the input point is located in the on-chip main memory based on the position parameter of the input point, the size of the input feature data, the first information, and the second information comprises:

determining a first width and a first height of a pixel block accommodated by a single partition based on a first number of slices included in the single partition and a second number of storage positions included in the single partition;

determining, based on the first information, a first sum of first widths of pixel blocks accommodated by various partitions that are ranked prior to the partition in which the input point is located;

determining, based on the second information, a second sum of second heights of pixel blocks accommodated by various slices that are ranked prior to the slice in which the input point is located in the partition in which the input point is located;

determining a second width of the input feature data based on the size of the input feature data; and determining the third information based on the position parameter of the input point, the first sum, the second sum, the first height, and the second width.

18. The electronic device according to claim 13, further comprising:

for another points among a plurality of points that match the target region tag except the input point, determining, based on position parameters of the another points and the size of the input feature data, second address information used for indicating a partition, a slice and a storage position in which the another points are located in the on-chip main memory; and obtaining feature values of the another points in the on-chip main memory, based on the second address information, to obtain the target feature value group comprising the feature value of the input point and the feature values of the another points, and adding the target feature value group to the on-chip buffer.

19. The electronic device according to claim 18, wherein the adding the target feature value group to the on-chip buffer comprises:

determining a numerical relationship between a number of feature value groups existing in the on-chip buffer and a preset number;

if the numerical relationship meets a preset condition, determining usage information corresponding to each feature value group in the on-chip buffer;

filtering, based on the usage information, a feature value group meeting a preset deletion condition from the on-chip buffer; and replacing the feature value group meeting the preset deletion condition in the on-chip buffer with the target feature value group.

20. The electronic device according to claim 13, wherein the obtaining a feature value of the input point in the on-chip main memory based on the first address information comprises:

determining a data bus corresponding to the partition and the slice that are indicated by the first address information; and obtaining the feature value of the input point from the storage position indicated by the first address information through the data bus.

* * * * *